United States Patent
Stephenson et al.

(10) Patent No.: US 8,077,675 B2
(45) Date of Patent: Dec. 13, 2011

(54) PERFORMANCE MANAGEMENT OF MOBILE INTELLIGENT ROAMING USING MOBILITY DETAIL RECORDS

(75) Inventors: David Sheldon Stephenson, San Jose, CA (US); Sudip Dhosal, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 12/396,643

(22) Filed: Mar. 3, 2009

(65) Prior Publication Data

US 2010/0226339 A1 Sep. 9, 2010

(51) Int. Cl.
*H04Q 7/00* (2006.01)
(52) U.S. Cl. ........................................ 370/331
(58) Field of Classification Search ............... 370/241, 370/248, 252, 310, 312, 315, 328, 331–333; 455/403, 404, 412, 414, 422–424, 436–444
See application file for complete search history.

(56) References Cited

U.S. PATENT DOCUMENTS

| | | | | |
|---|---|---|---|---|
| 6,633,555 B1 * | 10/2003 | Lin et al. | ...................... | 370/331 |
| 7,640,015 B2 * | 12/2009 | Connelly et al. | .............. | 455/423 |
| 7,668,534 B2 * | 2/2010 | Connelly | .................. | 455/412.1 |
| 2006/0274703 A1 * | 12/2006 | Connelly | ....................... | 370/338 |
| 2007/0099561 A1 * | 5/2007 | Voss | ............................. | 455/12.1 |
| 2007/0191012 A1 * | 8/2007 | Park et al. | ..................... | 455/436 |
| 2008/0253314 A1 | 10/2008 | Stephenson et al. | | |
| 2009/0180440 A1 * | 7/2009 | Sengupta et al. | ............. | 370/331 |
| 2009/0181673 A1 * | 7/2009 | Barrett | ......................... | 455/436 |
| 2010/0118830 A1 | 5/2010 | Stephenson et al. | | |

* cited by examiner

*Primary Examiner* — Dmitry H Levitan
(74) *Attorney, Agent, or Firm* — Edell, Shapiro & Finnan, LLC (57) ABSTRACT

Techniques are provided herein to improve the manageability of handover performance of multi-mode wireless client devices when roaming between a wireless local area network (WLAN) and at least one other network. Signals are received at a plurality of WLAN access points from multi-mode wireless client devices. The WLAN access points generate handover data associated with handover events of wireless Voice-Over Internet Protocol (VoIP) communication sessions for the multi-mode wireless client devices between the wireless local area network and at least one other network. The WLAN access points also generate link quality data representing status and quality of a wireless link with multi-mode wireless client devices during a VoIP communication session. A controller that is provided that is configured to receive the handover data and link quality data for multi-mode wireless client devices from the plurality of access points. The controller aggregates the handover data and link quality data for a VoIP communication session for a multi-mode wireless client device into a mobility detail record and stores the mobility detail record together with an identifier of an associated call detail record.

25 Claims, 6 Drawing Sheets

PERFORMANCE MANAGEMENT OF MOBILE INTELLIGENT ROAMING USING MOBILITY DETAIL RECORDS

TECHNICAL FIELD

The present disclosure relates to wireless communication systems, and more particularly to systems in which a mobile wireless communication device can roam between two different types of wireless networks or between two networks (of the same technology) which are administratively controlled by different entities.

BACKGROUND

Wireless communication technologies have rapidly developed over the last several years to the point where a mobile device, such as a mobile cellular telephone or a multi-function mobile wireless device (capable of email, internet browsing, voice calls, etc.), has the capability to operate in multiple wireless networks. For example, such a multi-mode device may be capable of operating in a wireless local area network (WLAN), such as a WiFi™ network and also with a wide area wireless network, such as a cellular network. For simplicity, a multi-mode or multi-mode wireless client device is referred to herein as a mobile node (MN). The MN may employ voice-over-internet protocol (VoIP) techniques when conducting a voice call via the WiFi network and more traditional circuit switching techniques when conducting a voice call via the cellular network. Consequently, the MN needs to reliably roam between the two different networks. This is particularly important when a user is in the middle of a voice call.

WLAN infrastructure provides triggers to the MN or to a network component informing it when, upon entering a building, robust wireless VoIP service is available and when upon leaving the building, robust wireless VoIP service can no longer be provided. Handover triggers are provided by network infrastructure; user-based policies, network-based policies and network conditions (both wired and wireless) can be applied to determine if and when to send handover triggers or if upon reception, whether to act upon them.

In order to determine when to send handover triggers, the WLAN infrastructure measures link parameters on the radio frequency (RF) wireless link between a WLAN access point (AP) and the MN or obtains these measurements from the MN. In WiFi networks, the MN determines the AP with which to associate. As the MN transitions from AP to AP, the link conditions naturally change. When the appropriate link parameters cross a threshold, the WLAN infrastructure generates and sends a handover trigger. In general, a handover trigger can be a hand-out trigger advising the MN to roam to a cellular network or a hand-in trigger advising the MN that it may roam in to the WiFi network.

A mechanism is needed whereby the handover service functionality is manageable so that a system administrator can diagnose situations associated with poor handover service and to change system parameters in order to improve handover service.

DESCRIPTION OF EXAMPLE EMBODIMENTS

Overview

Techniques are provided herein to improve the manageability of handover performance of multi-mode wireless client devices when roaming between a wireless local area network (WLAN) and at least one other network. Signals are received at a plurality of WLAN access points from multi-mode wireless client devices. The WLAN access points generate handover data associated with handover events of wireless Voice-Over Internet Protocol (VoIP) communication sessions for the multi-mode wireless client devices between the wireless local area network and at least one other network. The WLAN access points also generate link quality data representing status and quality of a wireless link with multi-mode wireless client devices during a VoIP communication session. A controller, e.g., a computing apparatus configured with software and hardware to perform mobility services engine functions, is provided that receives the handover data and link quality data for multi-mode wireless client devices from the plurality of access points. The controller aggregates the handover data and link quality data for a VoIP communication session for a multi-mode wireless client device into a mobility detail record. In addition, the controller associates each mobility detail record with a call detail record that describes end-to-end performance metrics associated with a VoIP communication session for each multi-mode wireless client device, and stores the mobility detail record together with an identifier of its associated call detail record.

Accordingly, the foregoing summarized techniques allow for proper management of handover service. The WLAN infrastructure makes appropriate measurements during a VoIP communication session, processes these measurements in some manner and then reports the results to a management system. The management system reports to system administrators a variety of performance metrics informing them of how well or how poorly the handover system is working. If the system is working poorly, a system administrator may then make adjustments to fix service impairments. Since measurements are continually reported, a closed-loop system is formed allowing the service to be properly tuned for optimum performance in any given network.

Figure 1:
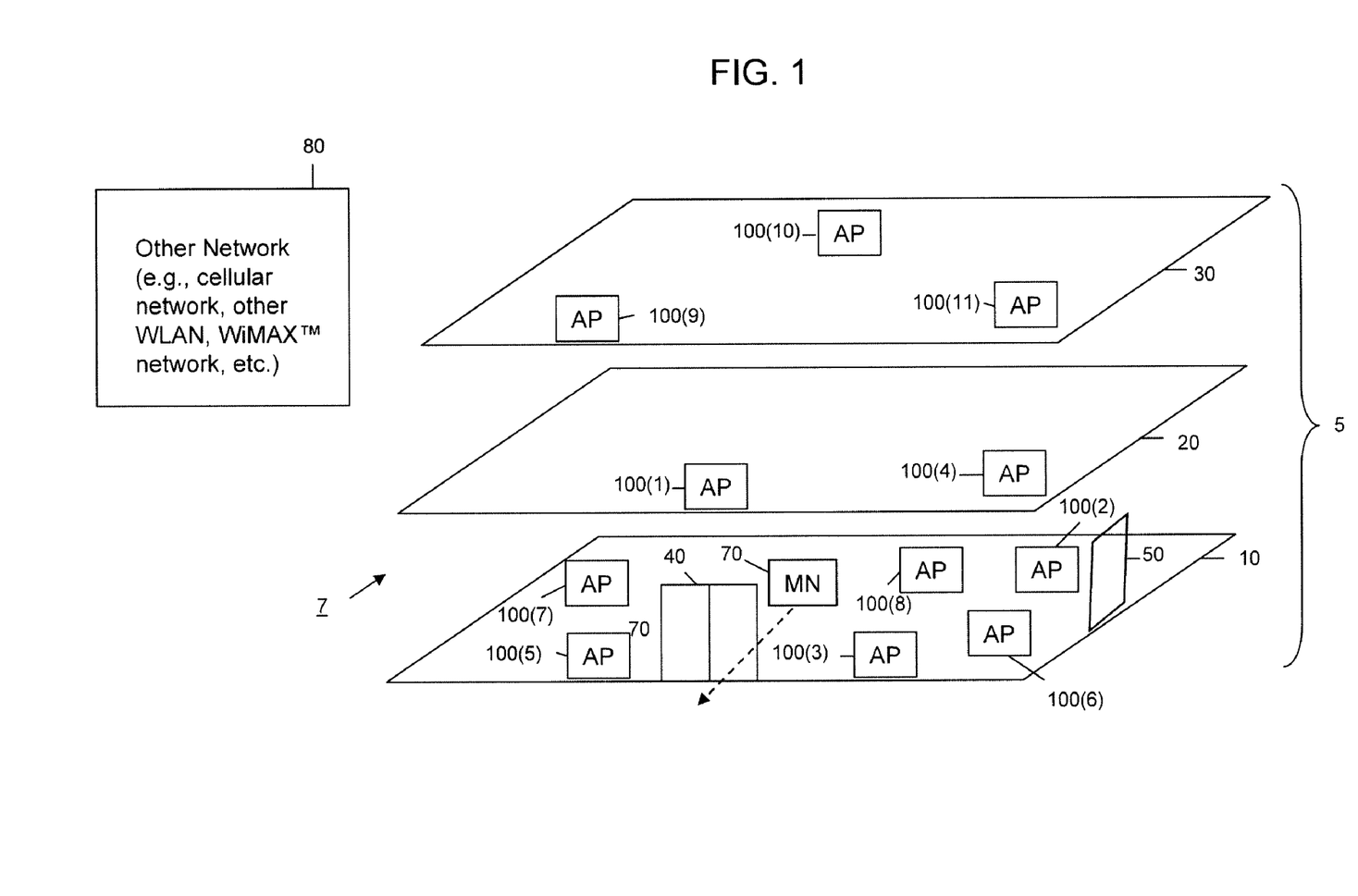
FIG. 1 is diagram of a building in which WLAN equipment is employed and showing a situation in which a communication session is to be handed over from the WLAN to another network or from the other network to the WLAN.

Referring first to FIG. 1, an example of a building is shown at reference numeral 5. The building 5 has multiple floors, e.g., a bottom floor 10 and two upper floors 20 and 30. A WLAN 7 is deployed in the building 5 using a plurality of APs. In this example, the building has two exits, one at the front identified by reference numeral 40 and one on the side shown at reference numeral 50. A MN is shown at reference numeral 70 and this MN 70 has multi-mode capability such that it can operate with a WLAN and also with at least one other network. To this end, another network is shown at reference numeral 80, and as described above, this other network may be a cellular network, a WiMAX™ wireless network, or another WLAN. For example, the MN 70 may conduct various wireless communication sessions for voice calls or other (data) services via the WLAN 7 or the other network 80. While a single MN is shown for simplicity in FIG. 1, it is understood that there are normally multiple MNs operating in the WLAN 7.

The APs shown in FIG. 1 are positioned at various locations around the building 5. For example, AP 100(1) is positioned relatively close in proximity to the exit 40 of the building 5. AP 100(2) is also relatively close to the exit 50. It should be understood that proximity as used herein means location in terms of RF proximity, e.g., receive signal strength information (RSSI) and not necessarily in an absolute {x,y,z} coordinate sense. Thus, when generating a handover trigger, it is not important that the trigger be provided at an exact {x,y,z} coordinate, but instead that it is provided before the MN 70 leaves adequate WLAN radio coverage, for example. APs 100(3) and 100(4) are located along a border of the building 5 but not necessarily close to an exit. APs 100(5) and 100(6) are located close to handover points, e.g., exits 40 and 50, respectively. Finally, APs 100(7)-100(11) are located generally in the interior of the building 5. It should be understood that while FIG. 1 shows APs 100(1)-100(11), there may be numerous additional APs, but for simplicity additional APs are not shown in FIG. 1.

Figure 2:
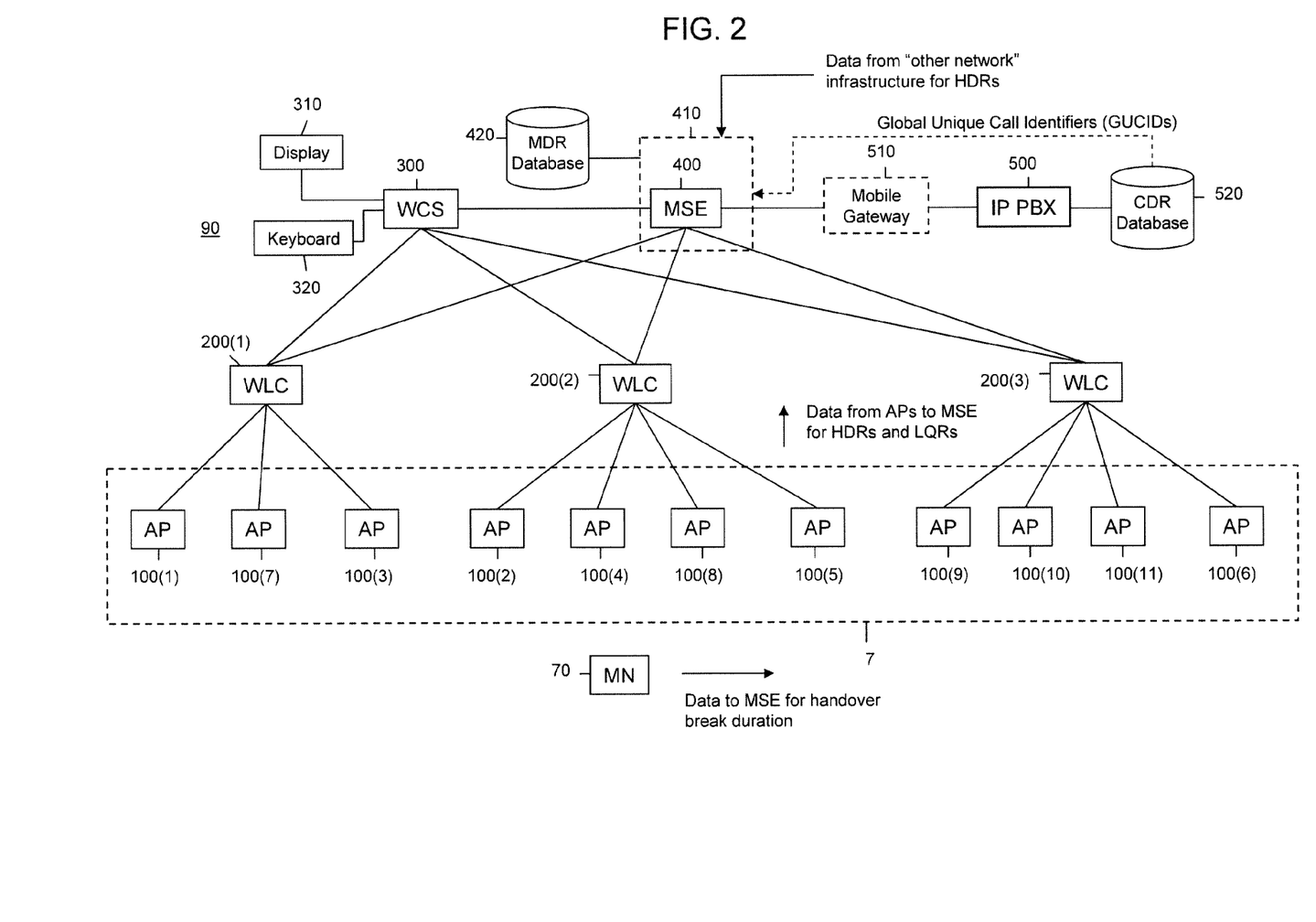
FIG. 2 is a block diagram showing an example of a configuration of the WLAN equipment to provide measurements used for generating a handover trigger, and from which data is collected to enable evaluation of performance of handovers between the WLAN and the other network.

Turning now to FIG. 2, an example of a WLAN infrastructure system shown generally at reference numeral 90 is now described. In the example of FIG. 2, there are WLAN controllers (WLCs) 200(1), 200(2) and 200(3) that connect to and communicate with multiple APs. The connection between a WLC and its APs is typically wired (e.g., via a wired local area network). Each WLC communications with a corresponding group of one or more APs. For example, WLC 200(1) connects to a plurality of APs including APs 100(1), 100(3) and 100(7), WLC 200(2) connects to plurality of APs including APs 100(2), 100(4), 100(5) and 100(8) and WLC 200(3) connects to a plurality of APs including APs 100(6) and 100(9)-100(11). Some APs may also be used to make measurements without being connected to a WLC, and thus would be configured to communicate directly with the MSE. Such APs would be "autonomous" in this sense, but still could provide information for making intelligent roaming handover decisions.

Each of the WLCs 200(1) to 200(3) is connected to a wireless control system (WCS) 300 and to a mobility services engine (MSE) 400. The MSE 400 is a software process executed by a computer processing apparatus (e.g., a server) shown at 410. Thus, the functions of the MSE 400 may be implemented by computer instructions stored on a computer readable medium that, when executed by a computer/processor, cause the computer/processor to perform the MSE functions described herein. Alternatively, the functions of the MSE may be performed by digital logic in a hardware/firmware form, such as with fixed digital logic gates in one or more application specific integrated circuits (ASICs), or programmable digital logic gates, such as in a field programming gate array (FPGA), or any combination of the two types of hardware/firmware processing forms. In sum, the logic for the MSE functions may be implemented in hardware or software, and the MSE functions described herein can therefore be performed by any suitably configured controller apparatus.

The WCS 300 performs higher level network management functions associated with the APs by and through their corresponding WLCs and for the WLCs themselves. For example, a system administrator uses the WCS 300 to configure the operational parameters of the AP's radios. The system administrator also uses the WCS 300 to input the locations of APs on a building's floorplan; both the floorplan and AP locations are provided to the MSE 400 for use in handover service functions.

The MSE 400 performs mobile roaming functions associated with MNs that move between the WLAN 7 and the other network 80 and vice versa. To this end, the MSE 400 is configured to connect to an IP PBX 500. The IP PBX 500 manages VoIP communication sessions in the WLAN and interfaces them with the public service telephone network. Alternatively, the MSE 400 may connect to a mobile gateway apparatus 510 which in turn connects to the IP PBX 500. The mobile gateway 510 is commonly used because many IP PBXs do not support the required mobility management functions needed to handover voice calls between the WiFi network and a cellular network. Autonomous APs may communicate directly with the MSE 400 since they are not configured to communicate with a WLC.

The APs perform link measurements and report them via their respective WLC to the MSE 400. The MSE 400 interprets the measurements and generates handover triggers. A hand-out trigger is a handover trigger associated with the MN leaving the WLAN 7 and continuing with communication sessions in progress via the other network. It is important that the MSE 400 send a hand-out trigger at the proper time. For example, when a MN is on a WLAN voice call, handing out the call to another network, e.g., a cellular network, can take up to seven seconds and much longer if it is an international call. This time period begins with call setup signaling to the cellular network and ends at the time the WLAN call media begins flowing over to the new call leg on the cellular network. With a typical user walking speed of 4 feet per second (FPS), a 7 second advance notice for a hand-out trigger translates to a distance of 28 feet. Thus, the MN may still be physically located within the building when the trigger needs to be provided.

For managing performance of the handover functionality of a system such as that shown in FIG. 1, a system administrator in interested to understand the MSE's operational status and handover performance of the MSE 400. A principle measure of handover performance is the time duration of the handover break. The MSE's operational status is important to know since it can have an impact on handover performance. For example, the larger the number of MNs subscribed for handover service, the greater the processing load on the MSE 400. At greater processing loads, the MSE 400 is more likely to have longer internal delays in generating handover triggers which can lead to longer handover breaks.

For performance management purposes, a system administrator would benefit from the following information:
  The number of MNs registered for handover service;
  The number of hand-out triggers sent to the MN (either directly or via an intermediary device); and
  The number of hand-in triggers sent to the MN (either directly or via an intermediary device).

For each handover event, the following additional information is useful to a system administrator and is collected using techniques described herein:
  Handover status, e.g., success, call drop, handover trigger ignored, handover aborted;

Handover trigger reason, e.g., MN has low receive signal strength information (RSSI) or MN has poor link quality; and Handover break time duration (described hereinafter).

The WCS 300 or other management system element can process the data from each of the handover events and output information to a display 310 for presentation to a system administrator via a user interface. This will provide to the system administrator an overall picture of how well/poorly the handover system is performing. The system administrator may make further analysis queries, described in more detail hereinafter, using a keyboard 320. For example, in the event a particular MN's user complains about poor handover performance, or if the system administrator notices poor or degrading overall performance levels, troubleshooting steps may be called for. In this case, the system administrator will likely need to look into the details of individual calls and handover events in order to diagnose system performance. A system administrator may use the display 310 and keyboard 320 to supply search queries and other commands and parameters to the MSE 400 via the WCS 300.

VoIP systems have traditionally used data referred to as call detail records (CDRs) to archive statistics about each phone call carried by the system. CDRs typically contain the following information: calling party, called party, call duration, globally unique call identifier (GUCID) and call quality statistics (e.g., average packet loss rate, average mean opinion score, end-to-end latency, etc.). In large deployments of VoIP networks, there is often more than one IP PBX in the enterprise network. In these cases, a call ID is globally unique so that the call ID generated by the IP PBX is not used for a different call handled on another IP PBX within that network. CDRs have been in use for a long time both as a record of the call for billing purposes and for diagnostic and troubleshooting purposes (when the call quality statistics indicate some undesirable level of impairment). CDRs are records of end-to-end performance and not records of performance on individual links or networks (e.g., WLAN or cellular networks). In practice, CDRs have limited utility since they do not contain link-by-link (L2) or hop-by-hop (L3) statistics. So while CDRs are used to identify the precise time and call corresponding to a user complaint, they do not identify the link or hop (or multiple links or hops) causing the impairment.

Normally, the CDRs are generated by network equipment, such as the enterprise's IP PBX device 500, and stored in its local database, e.g., CDR database 520 shown in FIG. 2. When the CDRs are generated, the IP PBX 500 includes the GUCID. The GUCID facilitates the CDR to be uniquely searched for within the CDR database as well as to be associated with other objects.

Accordingly, a new data record is defined, referred to herein as a mobility detail record (MDR). The MDR contains details of link performance rather than end-to-end performance. A MDR is composed of one or more handover detail records (HDRs) and one or more link quality records (LQRs). The MDR for a MN may comprise more than one HDR if more than one hand-in or hand-out trigger was generated during a single VoIP communication session and caused handovers to occur. Likewise, more than one LQR may be present in the MDR if the MN was associated to more than one AP during the course of a VoIP communication session or if link measurements were included for the network from which the call was handed in or out.

Each MDR also includes a GUCID. The GUCID binds the MDR with the CDR generated by the IP PBX device 500 so the system administrator can search the MDR associated with the poor-quality VoIP communication session that the user complained about. The MSE 400 may obtain the GUCID using one of several methods. In one method, the MSE 400 obtains the GUCID from the IP PBX 500 either through a signaling interface or via simple network management protocol (SNMP) signaling over the IP network. In a second implementation, the MSE 400 obtains the GUCID from snooping on signaling data, e.g., using "Session Initiation Protocol" (SIP) techniques. The MSE stores MDRs in a MDR database 420

Even though MDRs are described herein in terms of WiFi WLANs, they are applicable to any wireless technology which supports user mobility or handover between networks. For example, handover may occur between an IEEE 802.3 wired network and a GSM cellular network. MDRs may also include link metrics from more than one link type. For example, a MDR could contain LQRs from a WLAN and LQRs from a WiMAX network. Whether or not this is possible is based on whether the MSE 400 has access to link quality measurements, which constitute the LQR, from both links. For example, the MSE 400 may be owned by an enterprise network which also owns the WLAN. Thus, the MSE 400 has access to link measurements performed by the APs. However, the enterprise will likely not own the WiMAX infrastructure equipment and thus the MSE 400 may need to have access to the link measurements made by the WiMAX infrastructure equipment.

Figure 3:
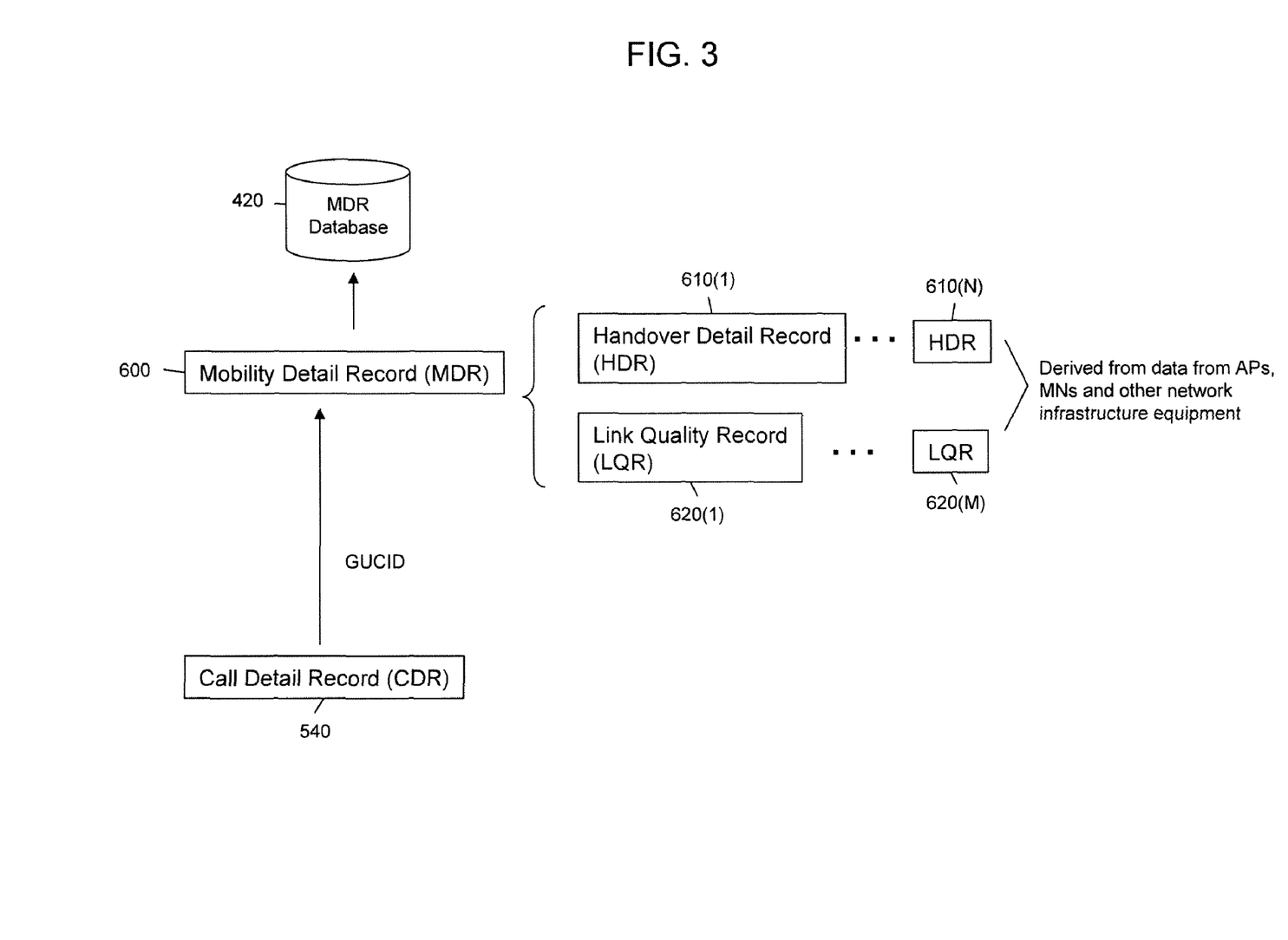
FIG. 3 is a block diagram illustrating a mobility detail record built from data received from the WLAN equipment and how the mobility detail record is associated with a call detail record.

Reference is now made to FIG. 3 for a further explanation of the MDRs. FIG. 3 shows an MDR 600 comprising one or more HDRs 610(1)-610(N) and one or more LQRs 620(1)-620(M). Each MDR is bound or associated with a corresponding CDR 540 by a GUCID for that VoIP communication session that is produced by the IP PBX 500 in generating the CDR. The MDRs are stored by the MSE 400 in the MDR database 420 shown in FIG. 2.

Each HDR contains information pertaining to a single handover event including:

MN device identification such as media access control (MAC) address, IP address and/or dial (phone) number.

Time of day, e.g., coordinated universal time (UTC) at which a handover trigger was transmitted to the MN (either directly or through an intermediary device such as a mobile gateway).

Handover status, e.g., success, call drop, handover trigger ignored, handover aborted.

Handover reason, e.g., MN has low receive signal strength information (RSSI) or MN has poor link quality.

Indication of whether the handover was successful and if so the time of day (e.g., UTC) at which the handover was completed.

Measurement of handover break duration.

Identifier of the AP to which the MN was associated when handover trigger was transmitted.

Location of the MN (if known) at the time the handover trigger was transmitted. The location information may be in (x,y,z) coordinates or in another location information format.

Snapshot of pertinent link metrics when the handover trigger was transmitted.

Identifier of the network to/from which the MN is being handed over (e.g., GSM, WiMAX, etc.)

In one implementation, the handover system is independent from the call control system. In this situation, there is separation of the protocol-stack layers. As such, a handover trigger does not force the call control layer to move the VoIP communication session from one network to another. It merely provides "advice" that a wireless link is "going down" (e.g., if an MN is leaving the building) or "ready for service"

(e.g., if an MN is entering the building). In these circumstances, the handover system may not know the communication session status—that is, whether a call is in progress or not and if so, whether a call was handed-in or handed-out.

The handover break duration is the time duration between service ending on one network and beginning on the other network during a handover event of an ongoing VoIP communication session. Measurement of the handover break duration requires network elements that are part of the system to be on the VoIP media or signaling paths for both networks (i.e., the original network and the one on which the handover completes) or to communicate with nodes that are on both signaling paths. For example, the IP PBX device 500 or the MN 70 itself may make these measurements and then report the information to the MSE 400 through the APs and WLCs. Alternatively, when the MSE 400 is on the signaling path, e.g., using SIP proxy functionality, the MSE 400 natively has the needed handover break information.

The handover break duration may be measured using only the two signaling paths. The MN 40 is the best device on which to perform this measurement since it terminates both communication session legs used for handover (i.e., one leg is the network path taken by the signal on the WLAN and the other leg is the path taken by the signal on the other network to or from which the handover occurs). When the MN 70 measures the handover break duration, it reports the measurement to the MSE 400 in a message it sends to the MSE 400, and the MSE in turn includes the handover break duration measurement data in the HDR for that MN 70.

However, some implementations of MNs may not provide the capability of measuring the handover break duration. The media path may be established on the both networks for a short time before the communication session is cutover to the new network, so simply noting the time at which the new media path is established is not sufficient for determining handover break duration. In this case, for hand-out the MN 70 may be configured to report when call (communication session) setup was completed on the other network and the WLAN infrastructure measures when the WLAN communication session is no longer in use (packets are no longer being sent over it) and the handover break is approximated by the time between these two epochs.

As explained above, each MDR also includes one or more LQRs. Each LQR provides summary statistics for the wireless link between the MN and an AP. As explained, there is an LQR for each AP to which the MN associated during a VoIP communication session. For VoIP service, LQRs contain the following information:

MN device identification such as MAC address, IP address and/or dial (phone) number.

AP device identification such as MAC address or WiFi basic service set identifier (BSSID).

Time of day (e.g., UTC) when the link was established (i.e., when the MN associated to the AP) and when the link was torn down (i.e., when the MN disassociated from the AP).

Statistics on upstream and downstream packet loss rate (PLR) for the wireless link. These statistics could be summarized in various ways such as average PLR, worst case PLR, consecutive packets lost, etc.

Statistics on upstream and downstream packet latency for the link. These statistics could be summarized in various ways such as average latency, worst case latency, etc.

Transition time indicating a time difference between when the last packet was successfully delivered to the MN on the "old" AP to the time the first packet was successfully delivered to the MN on this AP.

Summary of the AP's state during the communication session. This includes the number of simultaneous calls (both voice and video) handled by the AP at the time the MN is associated to the AP, channel utilization, noise floor, the AP's transmit power and channel number, power limit assigned to the AP and the MN's RSSI. Since the MN will typically be associated to an AP for a period of time and these parameters are dynamic, these parameters may be statistically summarized (e.g., minimum value, maximum value, average value, standard deviation, histogram, etc.)

LQRs can be also be generated for single-mode wireless client devices that are served by the WLAN.

Figure 4:
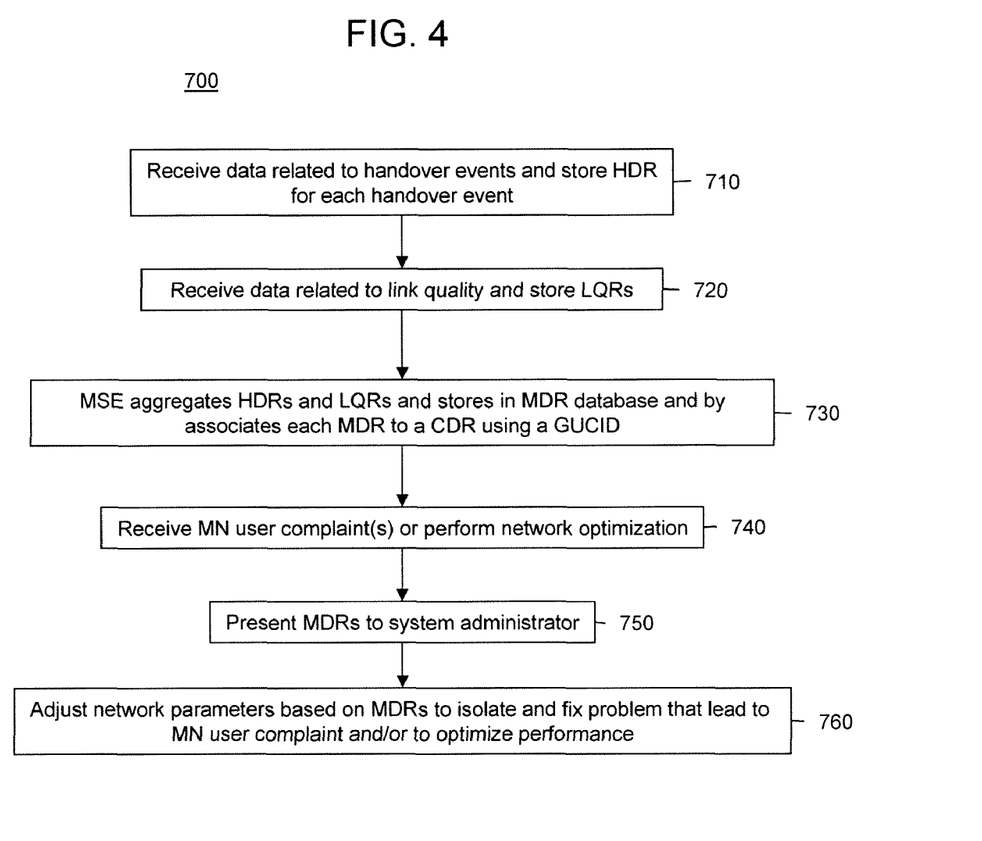
FIG. 4 is an example of a flow chart for a process that builds a database of mobility detail records to enable performance analysis and troubleshooting by a system administrator.
Figure 5:
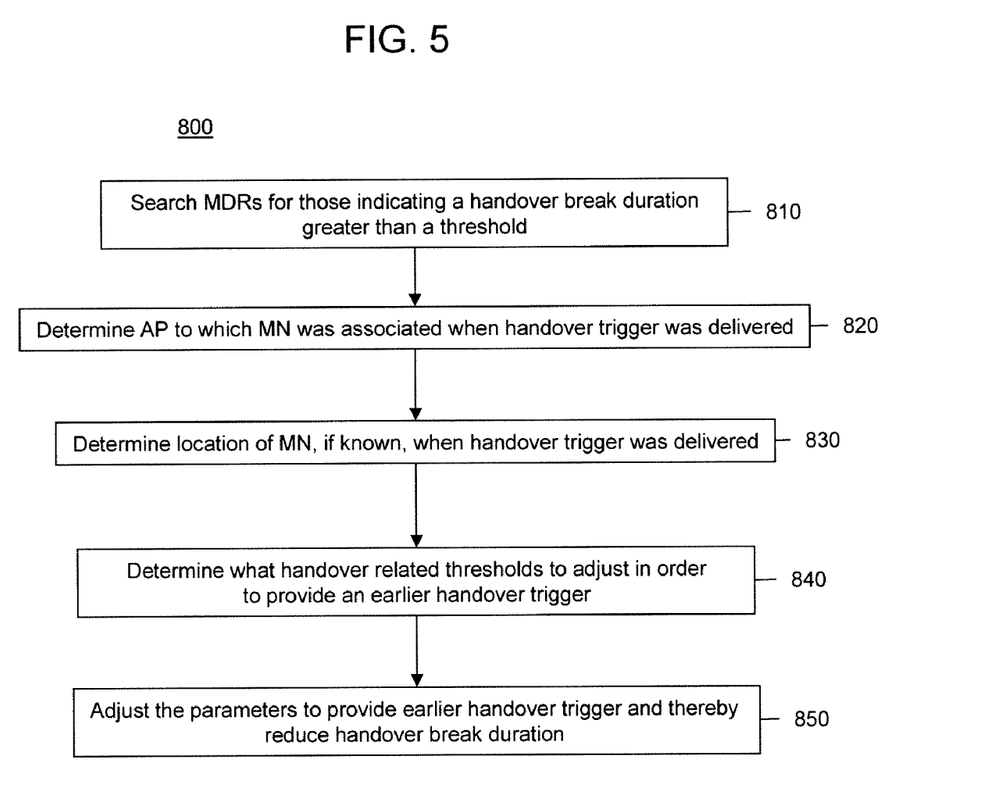
FIG. 5 is an example of a flow chart for a process to search and analyze data in mobility detail records in order to determine whether to adjust handover thresholds to improve handover performance.
Figure 6:
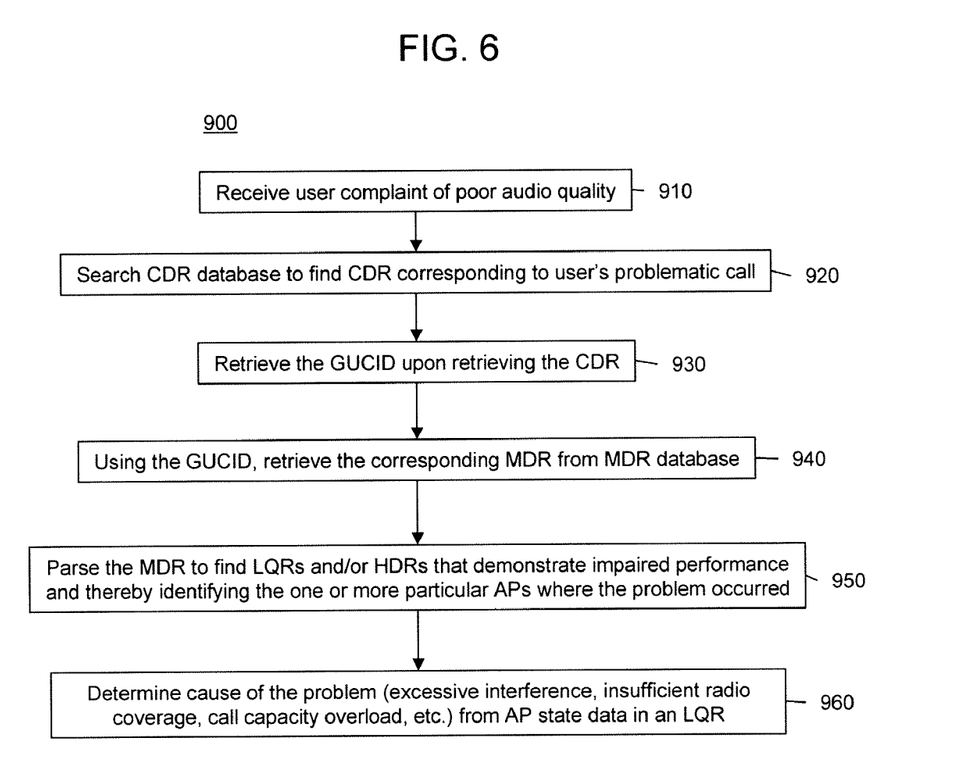
FIG. 6 is an example of a flow chart for a process to search and analyze data in mobility detail records in order to troubleshoot a user complaint as to poor performance in the course of a handover event.

There are several ways in which MDRs may be used by a system administrator. In general, they are used to optimize network performance and to troubleshoot MN user complaints. Referring to FIG. 4, a flow chart is shown for a process 700 that generally depicts use of the MDRs. FIGS. 5 and 6, described hereinafter, illustrate flow charts for more specific uses of MDRs. Moreover, these processes may be implemented as logic encoded in one or more tangible media for execution (by a processor or other data computing apparatus).

The process 700 shown in FIG. 4 represents functions performed at the MSE 400, though it is understood that the data used for these functions may originate at APs in the WLAN 7, the MN 70, the IP PBX 500, as well as infrastructure equipment for the "other network" to or from which the MN 70 may roam.

As shown in FIG. 4, at 710, the MSE receives data related to a handover event. As explained above in connection with the discussion of the HDRs, this handover event related data may be supplied by one or more APs in the WLAN 7, the MN 70 and the infrastructure equipment for the "other network" to which the MN 70 is handed-out or from which the MN 70 is handed-in. The MSE 400 stores an HDR for each handover event for the MN.

At 720, the MSE 400 receives data from the APs in the WLAN 7 related to link quality and stores LQRs for the MN 70.

At 730, the MSE stores MDRs comprising HDRs from the data received at 710 and LQRs from the data received at 720, in the MDR database for each MN. In addition, the MSE 400 associates (binds) each MDR to a CDR by a GUCID obtained by any of the means described above.

At 740, user complaints may be received from MN users or a system administrator may determine a need to perform network optimization. At 750, the MSE 400 presents MDRs to the system administrator. At 760, the system administrator, after analyzing the MDRs presented at 750, may adjust one or more network parameters to isolate and fix the problem that led to the MN user complaint and/or to otherwise optimize network performance.

Reference is now made to FIG. 5 for a process 800 for optimizing network performance by retrieving and analyzing relevant MDRs. At 810, a system administrator searches through the MDRs in the MDR database for those MDRs that indicate a handover break duration greater than a target threshold (e.g., a duration more than 300 ms). The function 810 may be automated in the sense that a system administrator may enter a command for a search query that contains a threshold, and database searching software compares this threshold with the handover break time duration data in each MDR in the MDR database to retrieve those MDRs for handover events that exceed the handover break time duration.

Upon finding one or more MDRs that meet this criterion, at 820, using the MDRs, a determination is made, for those handover events that exceed the handover break duration threshold, as to the AP to which an MN was associated when the handover trigger was generated and transmitted to the MSE 400. Again, the function 820 may be automated by software that parses the retrieved MDR records at 810 to extract from those records the identifiers of the APs listed in the MDRs to which an MN was associated with at the time of the handover trigger. At 830, a determination is made as to the location of an MN when the handover trigger was generated. The location may be based on the location of the AP identified at 820, or by a locationing process derived from signals received from the MN at multiple known locations, e.g., at multiple APs whose locations are known.

At 840, using data gathered from the retrieved MDRs at 820 and 830, a determination may be made as to whether to adjust one or more handover thresholds in order to provide an earlier handover trigger. In this regard, the RF coverage of the WLAN (either predicted or calibrated coverage) is determined and or already known. The system administrator, through network management experience, determines whether a threshold, such as an RSSI handover trigger threshold, should be adjusted at 840 to provide an earlier handover trigger. This would cause the MN to handover to the other network, e.g., cellular network, sooner when the user is leaving the building, thereby reducing handover break duration. At 850, the system administrator enters a command to the MSE 400 to make the adjustment to the handover trigger parameters, and the MSE 400 is then configured to use that parameter in the future when making handover trigger decisions. In a variation, the functions 840 and 850 are performed by software based on analysis of the MDR data and knowledge of the behavior of the network.

Turning now to FIG. 6, a process 900 performed at the MSE 400 is shown whereby a system administrator may troubleshoot complaints from MN users. This process begins at 910 upon receiving a user complaint of poor audio quality or other poor service quality associated with a VoIP communication session (lost message data, etc.). In response, at 920 the system administrator searches through the CDR database to find the CDR corresponding to the user's problematic VoIP communication session, e.g., phone call. Upon retrieving the CDR, at 930 the GUCID is found and at 940 the MSE uses the retrieved GUCID to find the associated MDR in the MDR database. The functions 920, 930 and 940 may be software automated whereby the system administrator enters an identifier for the MN device associated with the received user complaint and that identifier is used by the software to search the CDR database and retrieve the CDR associated with that MN. In addition, at 930, software may parse the retrieved CDR to extract the GUCID, and then use the GUCID to retrieve the corresponding MDR from the MDR database.

Next, at 950, the system administrator parses the MDR to find the LQRs and/or HDRs that demonstrate impaired performance. These LQRs and HDRs will point to the particular AP (i.e., a physical location) in the network where the problem occurred so that at 960, the cause of the problem may be determined. Software may be employed at the MSE 400 for function 950 to parse the MDR in order to identify such problematic LQRs and/or HDRs based on data in those records that indicate a trouble spot, and in so doing identify the particular one or more APs where the problem occurred leading to the reported user complaint. For example, the AP status data for that particular AP identified may reveal that it was subject to excessive interference, insufficient radio coverage, capacity overload, etc., that contributed to the poor audio quality at a handover event. Many of these causes can be ascertained via the snapshot summary of the AP's state in the LQR. Using the knowledge gained by the process 900, a system administrator may make changes in the WLAN equipment or changes to operating parameters of the WLAN equipment in order to remedy the poor performance reported by a user.

The techniques described herein provide improved performance management of VoIP handover service using CDRs and MDRs. Measurements are made in the network infrastructure equipment and in some cases, by the MN itself, and the measurement data is stored in a database to facilitate handover system performance reporting and troubleshooting. The CDRs and MDRs are tied together by a communication session ID., e.g., a GUCID. By fusing this data together, it makes it easier for a system administrator to respond to user complaints and to otherwise improve performance in the network even when no specific user complaints are made.

While the foregoing description makes reference to devices that can roam between a WiFi WLAN and a cellular network, this is meant by way of example only. For example, the techniques described herein may be useful for devices that roam between first and second different WiFi WLANs (administered by different entities), or between a WLAN and other types of wireless networks, such as a WiMAX™ network and a cellular network, etc.

Additionally, many of the techniques and system configurations described herein for a hand-out from a WiFi WLAN to another network, e.g., a cellular network, may be applied to a hand-in from another network to the WiFi WLAN. Also the measurements described above for handover (hand-in and hand-out) may be useful when there is no call or other communication session in progress (i.e., the MN is in idle state). It may not be as important when there is no in-progress communication application, but it can nevertheless be used for such purposes. It should be noted that HDRs cannot be correlated to CDRs via a GUCID in this case since no call is in progress during handover and consequently the IP PBX will not have a CDR nor have generated a GUCID.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    at a plurality of wireless local area network access points that are part of a wireless local area network:
        receiving signals from multi-mode wireless client devices that are configured to communicate in the wireless local area network and in at least one other network;
        generating handover data associated with handover events of wireless Voice-Over Internet Protocol (VoIP) communication sessions for multi-mode wireless client devices between the wireless local area network and the at least one other network; and
        generating link quality data representing status and quality of a wireless link with multi-mode wireless client devices during a VoIP communication session;
    at a controller:
        receiving the handover data and link quality data for multi-mode wireless client devices from the plurality of access points;

aggregating the handover data and link quality data for a VoIP communication session for a multi-mode wireless client device into a mobility detail record;

associating each mobility detail record with a call detail record that describes end-to-end performance metrics associated with a VoIP communication session for each multi-mode wireless client device; and storing the mobility detail record together with an identifier of its associated call detail record.

2. The method of claim 1, wherein generating handover data comprises generating an identifier of a multi-mode wireless client device involved in a handover event, handover status indicating whether or not a handover was successful, handover reason including low receive signal strength information or poor wireless link quality, handover break time duration associated with the handover, identifier of the access point to which a multi-mode wireless client device was associated when a handover trigger was transmitted, and identifier of the other network to or from which the handover occurred.

3. The method of claim 2, and further comprising measuring a time duration of a handover break at the multi-mode wireless client device, and transmitting a message containing data indicating the time duration to the controller for storage as the handover break time duration.

4. The method of claim 2, and further comprising measuring the time duration of a handover break based on a time difference between a time reported by the multi-mode wireless client device as to completion of communication session setup on either the wireless local area network or the other network for handout of the VoIP communication session and a time when it is determined that the VoIP communication session on either the wireless local area network or the other network from which handout is being made is no longer carrying packets.

5. The method of claim 1, wherein generating link quality data comprises generating an identifier of a multi-mode wireless client device involved in a hand-over event, identifier of an access point with which the multi-mode wireless client device was communicating, packet loss rate data and packet latency data associated with a wireless link between the multi-mode wireless client device and an access point, and statistics related to operational status of an access point during a VoIP communication session for a multi-mode wireless client device.

6. The method of claim 1, wherein associating comprises retrieving the identifier of a VoIP communication session from network equipment that stores such identifiers in connection with call detail records.

7. The method of claim 1, and further comprising retrieving one or more of the stored mobility detail records to analyze performance of handover functionality of the wireless local area network.

8. The method of claim 1, wherein storing comprises storing mobility detail records in a mobility detail records database, and further comprising searching the mobility detail records database to identify one or more mobility detail records having a handover break time duration in its handover data that exceeds a threshold.

9. The method of claim 8, and further comprising identifying the access point to which the multi-mode wireless client device was associated when a handover trigger was generated based on data in a mobility detail records whose handover break time duration exceeds the threshold in order to determine whether to adjust one or more handover related thresholds.

10. The method of claim 1, wherein storing comprises storing mobility detail records in a mobility detail records database, and further comprising searching a database containing the call detail records to find a call detail record associated with a particular multi-mode wireless client device for which performance degradation was reported, retrieving the identifier from the call detail record for the particular multi-mode wireless client device and retrieving a corresponding mobility detail record from the stored mobility detail records using the identifier.

11. The method of claim 10, and further comprising evaluating data contained in the retrieved mobility detail record in order to identify one or more access point devices that indicate impaired performance and thereby determine cause of the performance degradation.

12. A system comprising:

a plurality of wireless local area network access points that are part of a wireless network that serves one or more multi-mode wireless client devices that are capable of communicating in the wireless local area network and in at least one other network, wherein the access points are configured to receive signals from the multi-mode wireless client devices and to generate data related to handover events of a wireless Voice-Over Internet Protocol (VoIP) communication sessions for multi-mode wireless client devices between the wireless local area network at the at least one other network and to generate link quality data representing status and quality of a wireless link with multi-mode wireless client devices during a VoIP communication session; and a controller that is configured to communicate and receive data from the plurality of access points, wherein the controller is configured to receive the handover data and link quality data for multi-mode wireless client devices from the plurality of access points, aggregate the handover data and link quality data for a VoIP communication session for a multi-mode wireless client device into a mobility detail record, associate each mobility detail record with a call detail record that describes end-to-end performance metrics associated with a VoIP communication session; store the mobility detail record together with an identifier of its associated call detail record.

13. The system of claim 12, wherein the controller is configured to retrieve the identifier of a VoIP communication session from network equipment that stores such identifiers in connection with call detail records.

14. The system of claim 12, wherein the controller is configured to store mobility detail records in a mobility detail records database and to search the mobility detail records database to identify one or more mobility detail records having a handover break time duration in its handover data that exceeds a threshold.

15. The system of claim 14, wherein the controller is configured to identify the access point to which the multi-mode wireless client device was associated when a handover trigger was generated based on data in a mobility detail records whose handover break time duration exceeds the threshold in order to determine whether to adjust one or more handover related thresholds.

16. The system of claim 12, wherein the controller is configured to store mobility detail records in a mobility detail records database and to retrieve a call detail record associated with a particular multi-mode wireless client device for which performance degradation was reported, retrieve the identifier from the call detail record for the particular multi-mode wireless client device and retrieve a corresponding mobility detail record from the stored mobility detail records using the identifier.

17. A non-transitory tangible computer readable medium comprising program code for execution by a computer and when executed operable to:
- receive from a plurality of wireless local area network access points handover data associated with handover events of wireless Voice-Over Internet Protocol (VoIP) communication sessions for multi-mode wireless client devices between the wireless local area network and at least one other network;
- receive from the plurality of wireless local area network access points link quality data representing status and quality of a wireless link with multi-mode wireless client devices during a VoIP communication session;
- aggregate the handover data and link quality data for a VoIP communication session for a multi-mode wireless client device into a mobility detail record;
- associate each mobility detail record with a call detail record that describes end-to-end performance metrics associated with a VoIP communication session for each multi-mode wireless client device; and
- store the mobility detail record together with an identifier of its associated call detail record.

18. The computer readable medium of claim 17, wherein the computer readable medium comprises logic that is configured to store mobility detail records in a mobility detail records database, and further comprising logic configured to search the mobility detail records database to identify one or more mobility detail records having a handover break time duration in its handover data that exceeds a threshold.

19. The computer medium of claim 18, and further comprising logic that is configured to identify the access point to which the multi-mode wireless client device was associated when a handover trigger was generated based on data in a mobility detail records whose handover break time duration exceeds the threshold in order to determine whether to adjust one or more handover related thresholds.

20. The computer medium of claim 17, wherein the computer readable medium comprises logic that is configured to store mobility detail records in a mobility detail records database, and further comprising logic configured to retrieve a call detail record associated with a particular multi-mode wireless client device for which performance degradation was reported, retrieve the identifier from the call detail record for the particular multi-mode wireless client device and retrieve a corresponding mobility detail record from the stored mobility detail records using the identifier.

21. A method comprising:
- at a controller, receiving from a plurality of wireless local area network access points handover data associated with handover events of wireless Voice-Over Internet Protocol (VoIP) communication sessions for multi-mode wireless client devices between the wireless local area network and at least one other network;
- at the controller, receiving from the plurality of wireless local area network access points link quality data representing status and quality of a wireless link with multi-mode wireless client devices during a VoIP communication session;
- at the controller, aggregating the handover data and link quality data for a VoIP communication session for a multi-mode wireless client device into a mobility detail record;
- at the controller, associating each mobility detail record with a call detail record that describes end-to-end performance metrics associated with a VoIP communication session for each multi-mode wireless client device; and
- at the controller, storing the mobility detail record together with an identifier of its associated call detail record.

22. The method of claim 21, wherein storing comprises storing mobility detail records in a mobility detail records database, and further comprising searching the mobility detail records database to identify one or more mobility detail records having a handover break time duration in its handover data that exceeds a threshold.

23. The method of claim 22, and further comprising identifying the access point to which the multi-mode wireless client device was associated when a handover trigger was generated based on data in a mobility detail records whose handover break time duration exceeds the threshold in order to determine whether to adjust one or more handover related thresholds.

24. The method of claim 21, and further comprising storing mobility detail records in a mobility detail records database, and further comprising searching a database containing the call detail records to find a call detail record associated with a particular multi-mode wireless client device for which performance degradation was reported, retrieving the identifier from the call detail record for the particular multi-mode wireless client device and retrieving a corresponding mobility detail record from the stored mobility detail records using the identifier.

25. The method of claim 24, further comprising evaluating data contained in the retrieved mobility detail record in order to identify one or more access point devices that indicate impaired performance and thereby determine cause of the performance degradation.

* * * * *

UNITED STATES PATENT AND TRADEMARK OFFICE
CERTIFICATE OF CORRECTION

| | | |
|---|---|---|
| PATENT NO. | : 8,077,675 B2 | Page 1 of 1 |
| APPLICATION NO. | : 12/396643 | |
| DATED | : December 13, 2011 | |
| INVENTOR(S) | : David Sheldon Stephenson | |

It is certified that error appears in the above-identified patent and that said Letters Patent is hereby corrected as shown below:

On the Title page of the patent in section (75) Inventors, replace "Sudip Dhosal" with -- Sudip Ghosal --.

Signed and Sealed this

Seventh Day of February, 2012

David J. Kappos
*Director of the United States Patent and Trademark Office*